(12) United States Patent
Fujita et al.

(10) Patent No.: US 8,716,421 B2
(45) Date of Patent: May 6, 2014

(54) NORBORNENE-TYPE FORMATE MONOMERS AND POLYMERS AND OPTICAL WAVEGUIDES FORMED THEREFROM

(71) Applicant: Sumitomo Bakelite Co., Ltd., Tokyo (JP)

(72) Inventors: Kazuyoshi Fujita, Tokyo (JP); Nanae Kawate, Tokyo (JP); Mari Ueda, Tokyo (JP); Larry F Rhodes, Silver Lake, OH (US)

(73) Assignees: Promerus, LLC, Brecksville, OH (US); Sumitomo Bakelite Co., Ltd, Tokyo (JP)

(*) Notice: Subject to any disclaimer, the term of this patent is extended or adjusted under 35 U.S.C. 154(b) by 0 days.

(21) Appl. No.: 13/900,993

(22) Filed: May 23, 2013

(65) Prior Publication Data
US 2013/0345382 A1 Dec. 26, 2013

Related U.S. Application Data

(60) Provisional application No. 61/663,662, filed on Jun. 25, 2012.

(51) Int. Cl.
G02B 6/10 (2006.01)
C08F 32/08 (2006.01)
C08F 32/02 (2006.01)
C07C 69/017 (2006.01)

(52) U.S. Cl.
USPC .......... 526/282; 524/547; 524/548; 524/553; 525/329.5; 525/386; 526/256; 526/259; 526/265; 526/268; 526/281; 540/584; 546/154; 546/290; 546/304; 549/80; 560/129; 560/201; 560/255; 564/222; 568/75; 385/143

(58) Field of Classification Search
USPC .......... 385/143; 522/154, 153; 526/256, 259, 526/265, 268, 282, 281; 540/584; 546/297, 546/304, 290; 549/80; 564/215, 222; 560/129, 201, 255; 568/177, 75; 525/329.5, 386; 524/547, 548, 553
See application file for complete search history.

(56) References Cited

U.S. PATENT DOCUMENTS

| | | | |
|---|---|---|---|
| 3,330,815 A * | 7/1967 | McKeon et al. | 526/171 |
| 5,292,620 A | 3/1994 | Booth et al. | |
| 5,929,181 A | 7/1999 | Makovetsky et al. | |
| 6,048,664 A * | 4/2000 | Houlihan et al. | 430/270.1 |
| 6,136,499 A | 10/2000 | Goodall et al. | |
| 6,455,650 B1 | 9/2002 | Lipian et al. | |
| 6,825,307 B2 | 11/2004 | Goodall | |
| 7,101,654 B2 | 9/2006 | Wu et al. | |
| 7,820,356 B2 | 10/2010 | Choki et al. | |
| 2005/0187398 A1 | 8/2005 | Bell et al. | |

FOREIGN PATENT DOCUMENTS

| | | |
|---|---|---|
| JP | 2001-296438 | 10/2001 |
| JP | 2004-35838 | 2/2004 |
| JP | 2005-283840 | 10/2005 |
| JP | 2010-90328 | 4/2010 |

* cited by examiner

Primary Examiner — Fred M Teskin
(74) Attorney, Agent, or Firm — Balaram Gupta (57) ABSTRACT

This invention discloses and claims a series of polycyclic monomers and polymers useful in the production of optical waveguides. The polymers of the invention comprise one or more repeating units represented by the formula (IV):

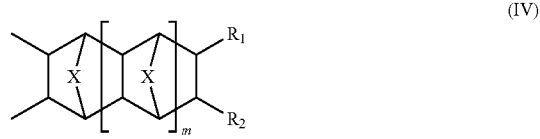

(IV)

Wherein m, X, $R_1$ and $R_2$ are as defined herein. The films formed from the polymers of this invention exhibit significant changes in refractive index (greater than or equal to 0.5%) after exposure to suitable actinic or thermal energy thereby having superior optical transmission performance, which is of importance for modern optical applications such as wave guiding and optical data storage.

25 Claims, 1 Drawing Sheet

NORBORNENE-TYPE FORMATE MONOMERS AND POLYMERS AND OPTICAL WAVEGUIDES FORMED THEREFROM

CROSS REFERENCE TO RELATED APPLICATIONS

This application claims the benefit of U.S. Provisional Application No. 61/663,662, filed Jun. 25, 2012, which is incorporated herein by reference in its entirety.

TECHNICAL FIELD

This invention relates generally to aryl or heteroaryl formate substituted poly(cyclic) olefin monomers and polymers derived therefrom. More particularly, this invention relates to aryl or heteroaryl substituted norbornene-type monomers and polymers derived therefrom. This invention also relates to uses of such polymers in fabricating optical waveguides.

BACKGROUND

In recent years there has been a greater demand for compact electronic devices which feature higher performance. In particular, studies have been conducted on increasing the speed of signal transmission paths within electronic devices by connecting electronic components with optical signals in order to increase signal transmission rates, and optical waveguides have attracted attention as optical transmission media for that purpose. Optical waveguides encompass a first medium which is essentially transparent to the light of the optical frequency carrier waves and a second medium having a lower refractive index than that of the first medium. The first medium is surrounded by, or otherwise enclosed within, the second medium. Light introduced into an end of the first medium undergoes total internal reflection at the boundary with the second medium and thus is guided along an axis of the first medium. Perhaps the most frequently used optical transport medium is glass formed into an elongated fiber.

However, while glass optical fibers are convenient for data transfer over long distances, they are inconvenient for complex high-density circuitry because the high density of such circuitry makes their use problematic and expensive. Polymeric materials, on the other hand, hold great promise for constructing cost effective, reliable, passive and active integrated components capable of performing the required functions for integrated optics.

Therefore, considerable effort has been directed to forming optical coupling devices and more recently to optical waveguides that can be formed of polymeric materials using photohardenable techniques. For example, U.S. Pat. Nos. 5,292,620; and 7,820,356 disclose forming certain of such waveguide structures having a predetermined geometry.

There are also other techniques used in forming optical waveguides using organic polymeric materials. For example, Japanese laid-open patent publications Nos. JP 2004-35838 H10-48443 and JP 2001-296438 disclose a method of exposing a polymer film to an actinic radiation to change the chemical structure of the polymer so as to obtain a waveguide structure.

Similarly, Japanese laid-open patent publication Nos. JP 2005-283840 and JP 2010-90328 disclose certain photosensitive resin compositions useful for the formation of an optical waveguide. However, methods disclosed therein for the fabrication of the optical waveguide appears to be complicated, and there appears to be further need for developing better polymeric compositions that are capable of providing better transmission properties, compact size and higher performance of electronic devices.

BRIEF DESCRIPTION OF THE DRAWINGS

Embodiments of the invention are described below with reference to the following accompanying drawings.

FIGS. 2(1), 2(2) and 2(3) are simplified cross-sectional views illustrating a method embodiment in accordance with the present invention useful for forming the optical waveguide embodiment depicted in FIG. 1.

DETAILED DESCRIPTION

Disclosed herein are embodiments in accordance with the present invention that encompass monomers, polymeric resin composition embodiments, resin film embodiments and optical waveguide embodiments formed therefrom that advantageously provide hitherto unachievable optical transmission performance.

Exemplary embodiments of the present invention will be described including with reference to the aforementioned figures. Various modifications, adaptations or variations of such exemplary embodiments described herein may become apparent to those skilled in the art as such are disclosed. It will be understood that all such modifications, adaptations or variations that rely upon the teachings of the present invention, and through which these teachings have advanced the art, are considered to be within the scope and spirit of the present invention.

More specifically, embodiments in accordance with the present invention are directed to providing monomers and methods of forming polycyclic olefin polymers, utilizing said monomers. Some embodiments in accordance with the present invention are further directed to providing methods for utilizing such polymers in forming optical waveguides.

Unless otherwise indicated, all numbers, values and/or expressions referring to quantities of ingredients, reaction conditions, etc., used herein are to be understood as modified in all instances by the term "about" as absent the aforementioned indication, such numbers are approximations reflective of, among other things, the various uncertainties of measurement encountered in obtaining such values. Further, where a numerical range is disclosed herein such range is continuous, and includes every value between the minimum and maximum values of such range. Still further, where a range refers to integers, every integer between the minimum and maximum values of such range is included.

As used herein, the symbol "$\sim\!\!\sim\!\!\sim$" denotes a position at which the bonding takes place with another repeat unit or another atom or molecule or group or moiety as appropriate with the structure of the group as shown.

As used herein, the term "polymer composition" is meant to include a synthesized polymer, as well as residues from initiators, catalysts and other elements attendant to the synthesis of such polymer, where such residues are understood as not being covalently incorporated thereto. Such residues and other elements considered as part of the polymer composition are typically mixed or co-mingled with the polymer such that they tend to remain with the polymer when it is transferred between vessels or between solvent or dispersion media. A polymer composition can also include materials added after synthesis of the polymer to provide or modify specific properties to such composition.

As used herein, "hydrocarbyl" refers to a moiety or a group that contains only carbon and hydrogen, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all of the hydrogens have been replaced by a halogen.

As used herein, "alkyl" refers to a linear or branched acyclic or cyclic, saturated hydrocarbon group having a carbon chain length of, for example, from C1 to C25. Non-limiting examples of suitable alkyl groups include, but are not limited to, —(CH2)3CH3, —(CH2)4CH3, —(CH2)5CH3, —(CH2)10CH3, —(CH2)23CH3 and cyclohexyl. The term "alkylol" refers to alkyl groups that include one or more hydroxyl groups.

As used herein, the expression "(C1-C6)perfluoroalkyl" means that all of the hydrogen atoms in said alkyl group are replaced with fluorine atoms. Illustrative examples include trifluoromethyl and pentafluoroethyl, and straight-chained or branched heptafluoropropyl, nonafluorobutyl, undecafluoropentyl and tridecafluorohexyl groups. Derived expression, "(C1-C6)perfluoroalkoxy", is to be construed accordingly.

As used herein the term "aryl" refers to aromatic groups that include, without limitation, groups such as phenyl, biphenyl, benzyl, xylyl, naphthalenyl, anthracenyl, phenanthranyl, and the like. Generally "aryl" groups as referred to herein are divalent moieties. Other "aryl" groups as contemplated herein include but not limited to any of the divalent moieties derived from triphenylamine, diphenylamine, triphenylmethane, diphenylmethane, and the like. Similarly, "substituted aryl," such as "substituted phenyl" or "substituted naphthyl" shall include any of the possible substituents as further defined herein or one known in the art. Derived expressions, such as "arylsulfonyl," are to be construed accordingly.

As used herein, the expression "heteroaryl" includes all of the known heteroatom containing aromatic groups. Representative 5-membered heteroaryl groups include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl groups include pyridinyl, pyridazinyl, pyrimidinyl, pyrazolyl, triazinyl, and the like. Representative examples of bicyclic heteroaryl groups include, benzofuranyl, benzothiophenyl, indolyl, quinolinyl, isoquinolinyl, cinnolyl, benzimidazolyl, indazolyl, pyridofuranyl, pyridothienyl, and the like.

As used herein the terms "alkaryl" or "aralkyl" refer to a linear or branched acyclic alkyl group substituted with at least one aryl group, for example, phenyl, and having an alkyl carbon chain length of C2 to C25. The aryl group can be further substituted, if desired. Non-limiting examples of suitable substituent groups for the aryl group include, among others, hydroxyl groups, benzyl groups, carboxylic acid and carboxylic acid ester groups and aliphatic hydrocarbon groups. The alkyl group can be substituted with halogens.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of (C1-C6)alkyl, (C2-C6)alkenyl, (C1-C6)perfluoroalkyl, phenyl, hydroxy, —CO2H, an ester, an amide, (C1-C6)alkoxy, (C1-C6)thioalkyl, (C1-C6)perfluoroalkoxy, —NH2, Cl, Br, I, F, —NH-lower alkyl, and —N(lower alkyl)2. However, any of the other suitable substituents known to one skilled in the art can also be used in these embodiments.

As used herein the term "thermolysis" means dissociation of compounds by heat and not to be construed as decomposition.

Monomers

Embodiments in accordance with the present invention are suitable for the preparation of polymers encompassing a wide range of "polycyclic" repeating units. As defined herein, the terms "polycyclic olefin" or "polycycloolefin" mean the same and are used interchangeably to represent the compounds of this invention. As a representative example of such a compound or a monomer is "norbornene-type" monomer and is referred to herein as addition polymerizable monomer (or the resulting repeating unit), that encompass at least one norbornene moiety such as shown below:

The simplest norbornene-type or polycyclic olefin monomer encompassed by embodiments in accordance with the present invention is the bicyclic monomer, bicyclo[2.2.1]hept-2-ene, commonly referred to as norbornene. However, the term norbornene-type monomer or repeating unit is used herein to mean norbornene itself as well as any substituted norbornene(s), or substituted and unsubstituted higher cyclic derivatives thereof. Representative examples of such monomers include but not limited to bicyclo[2.2.2]oct-2-ene, 7-oxabicyclo[2.2.1]hept-2-ene, 7-thiabicyclo[2.2.1]hept-2-ene, 7-azabicyclo[2.2.1]hept-2-ene, 1,2,3,4,4a,5,8,8a-octahydro-1,4:5,8-dimethanonaphthalene, 1,4,4a,5,6,7,8,8a-octahydro-1,4-epoxy-5,8-methanonaphthalene, and the like.

Thus in accordance with an aspect of this invention there is provided a compound of the formula (I):

wherein:

X is selected from —CH$_2$—, —CH$_2$—CH$_2$—, —O—, —S—, and —NH—;

m is an integer from 0 to 5; and each occurrence of $R_1$ and $R_2$ independently represents hydrogen or a monovalent moiety or a group of the formula (A):

wherein:
X₁ is selected from —O—, —S—, and —NH—;
Ar is a divalent moiety or a group which is substituted or unsubstituted aryl or heteroaryl; and
with the proviso that both R₁ and R₂ are not simultaneously hydrogen.

In an embodiment of this invention, the compound represented by formula (I) is defined by the following substituents:
X is —CH₂—;
m is 0;
X₁ is —O—; and
Ar is aryl.

In another embodiment of this invention, the compound represented by formula (I) is defined by the following substituents:
X is —CH₂—;
m is 0;
X₁ is —O—; and
Ar is heteroaryl.

In yet another embodiment of this invention, the compound represented by formula (I) is defined by Ar, which is aryl selected from substituted or unsubstituted phenyl, substituted or unsubstituted naphthyl, substituted or unsubstituted anthracenyl, substituted or unsubstituted phenanthrenyl, substituted or unsubstituted triphenylamine, substituted or unsubstituted cyclopentadienyl, and wherein said substituents are selected from $C_1$-$C_4$alkyl, $C_1$-$C_4$alkoxy, halogen, and $C_1$-$C_4$ perfluoroalkyl.

In yet another embodiment of this invention, the compound represented by formula (I) is defined by Ar, which is selected from 4-phenyl, 3-methyl-4-phenyl, 3,5-dimethyl-4-phenyl, 3-methoxy-4-phenyl, 3,5-dimethoxy-4-phenyl, 3-fluoro-4-phenyl, 3,5-difluoro-4-phenyl, and 6-naphthyl.

In yet another embodiment of this invention, the compound represented by formula (I) is defined by Ar, which is selected from substituted or unsubstituted thienyl, substituted or unsubstituted furanyl, substituted or unsubstituted pyrrolyl, substituted or unsubstituted pyridinyl, and substituted or unsubstituted quinolinyl.

In another embodiment of this invention the compound of this invention is represented by the formula (II):

(II)

wherein Ar is a divalent moiety selected from phenyl, naphthyl, anthracenyl and triphenylamine.

In another embodiment of this invention the compound of this invention is represented by the formula (III):

(III)

wherein Ar is a divalent moiety which in each occurrence is independently selected from phenyl, naphthyl, anthracenyl and triphenylamine.

Representative divalent "Ar" groups are structurally shown below without any limitation. The position of substitution is shown by a bond marked with "〰" for illustrative purposes only. However, all possible position of linkage to form a divalent group can be envisaged. Similarly all of the groups shown below can be suitably substituted.

(1,4-phenyl)

(2,6-naphthyl)

(2,6-anthracenyl)

(2,7-phenanthranyl)

2,5-dimethyl-N,N-diphenylaniline

In another aspect of this invention representative compounds encompassed by compound of formula (I) of this invention without any limitation are listed below:

4-(bicyclo[2.2.1]hept-5-en-2-yl)
phenyl formate

4-(bicyclo[2.2.1]hept-5-en-2-yl)-3-
methylphenyl formate

4-(bicyclo[2.2.1]hept-5-en-2-yl)-3,5-
dimethylphenyl formate

4-(bicyclo[2.2.1]hept-5-en-2-yl)-3-
methoxyphenyl formate 4-(bicyclo[2.2.1]hept-5-en-2-yl)-3,5-
dimethoxyphenyl formate 4-(bicyclo[2.2.1]hept-5-en-2-yl)-3-
fluoroyphenyl formate 4-(bicyclo[2.2.1]hept-5-en-2-yl)-3,5-
difluorophenyl formate

-continued

6-(bicyclo[2.2.1]hept-5-en-2-yl)
naphthalen-2-yl formate

7-(bicyclo[2.2.1]hept-5-en-2-yl)anthracen-2-yl formate

7-(bicyclo[2.2.1]hept-5-en-2-yl)
phenanthren-2-yl formate

3-((4-(bicyclo[2.2.1]hept-5-en-2yl)phenyl)
(phenyl)amino)phenyl formate 6-(bicyclo[2.2.1]hept-5-en-2-yl)
pyridin-3-yl formate 3-(bicyclo[2.2.1]hept-5-en-2-yl)
quinolin-7-yl formate; and

5-(bicyclo[2.2.1]hept-5-en-2-yl) furan-3-yl formate

In a further embodiment of this invention the compound according to this invention is 4-(bicyclo[2.2.1]hept-5-en-2-yl)phenyl formate.

The compounds of this invention can be synthesized by any of the procedures known to one skilled in the art. Specifically, several of the starting materials used in the preparation of the compounds of this invention are known or are themselves commercially available. The compounds of this invention and several of the precursor compounds may also be prepared by methods used to prepare similar compounds as reported in the literature and as further described herein. See for instance, U.S. Pat. No. 6,825,307.

In general, an economical route for the preparation of compounds of formula (I), wherein m=0, (also compounds of formula (II) and (III)) relies on the Diels-Alder addition reaction in which a compound of formula (VII), e.g., cyclopentadiene or its analogs, such as 1,3-cyclohexadiene, furan, thiophene or pyrrole (i.e., X=CH2, —CH2—CH2—, O, S, or NH) is reacted with a suitable dienophile of formula (VIII) at suitable reaction temperatures which are typically at elevated temperatures to form the compounds of formula (I) generally shown by the following reaction scheme I:

Scheme I wherein m = o wherein R1 and R2 are as defined herein.

Other compounds of formula (I) can also be prepared similarly by the thermolysis of a compound of the formula (IX), such as for example dicyclopentadiene (DCPD) when X=CH2, in the presence of a suitable dienophile of formula (VIII). The reaction proceeds by the initial thermolysis of compound of formula (IX) to compound of formula (VII) followed by the Diels-Alder addition of compound of formula (VII) and the dienophile of formula (VIII) and subsequent additions with a dienophile of formula (I), wherein m=0, and so on to give the adducts shown below in Scheme II:

Scheme II wherein m, R1 and R2 are as defined herein.

The dienophile of formula (VIII) is either generally available commercially or can be prepared following any of the known literature procedures. In general, the dienophile of formula (VIII) is either a monoaryl (or heteroaryl) formate, thioformate or a formamide of formula (VIIIa) or diaryl (or heteroaryl) formate, thioformate or a formamide of formula (VIIIb).

(VIIIa)

(VIIIb)

Both dienophiles of formula (VIIIa) or (VIIIb) can readily be prepared first by forming a suitable acetate or other precursor, which can then be converted to the corresponding formate using any of the known literature procedures.

Polymers

In accordance with another aspect of this invention there is provided a polymer composition comprising polycyclic repeating units generally formed by the polymerization of monomers of formula (I):

(I)

and wherein at least a portion of said repeating units are represented by the formula (IV):

(IV)

wherein:

X is selected from —CH$_2$—, —CH$_2$—CH$_2$—, —O—, —S—, and —NH—;

m is an integer from 0 to 5; and each occurrence of R$_1$ and R$_2$ independently represents hydrogen or a monovalent group or a moiety of the formula (A):

(A)

wherein:

X$_1$ is selected from —O—, —S—, and —NH—;

Ar is a divalent group or a moiety which is substituted or unsubstituted aryl or heteroaryl; and with the proviso that both R$_1$ and R$_2$ are not simultaneously hydrogen.

In an embodiment of this aspect of the invention, the polymer composition consists essentially of the repeating units represented by formula (IV).

In an embodiment of this aspect of the invention, the polymer composition represented by formula (IV) is defined by the following substituents:

X is —CH$_2$—;

m is 0;

X$_1$ is —O—; and

Ar is aryl.

In another embodiment of this aspect of the invention, the polymer composition represented by formula (IV) is defined by the following substituents:

X is —CH$_2$—;

m is 0;

X$_1$ is —O—; and

Ar is heteroaryl.

In yet another embodiment of this aspect of the invention, the polymer composition represented by formula (IV) is defined by Ar, which is aryl selected from substituted or unsubstituted phenyl, substituted or unsubstituted naphthyl, substituted or unsubstituted anthracenyl, substituted or unsubstituted phenanthrenyl, substituted or unsubstituted triphenylamine, substituted or unsubstituted cyclopentadienyl, and wherein said substituents are selected from C$_1$-C$_4$alkyl, C$_1$-C$_4$alkoxy, halogen, and C$_1$-C$_4$perfluoroalkyl.

In yet another embodiment of this aspect of the invention, the polymer composition represented by formula (IV) is defined by Ar, which is selected from 4-phenyl, 3-methyl-4-phenyl, 3,5-dimethyl-4-phenyl, 3-methoxy-4-phenyl, 3,5-dimethoxy-4-phenyl, 3-fluoro-4-phenyl, 3,5-difluoro-4-phenyl, and 6-naphthyl.

In yet another embodiment of this aspect of the invention, the polymer composition represented by formula (IV) is defined by Ar, which is selected from substituted or unsubstituted thienyl, substituted or unsubstituted furanyl, substituted or unsubstituted pyrrolyl, substituted or unsubstituted pyridinyl, and substituted or unsubstituted quinolinyl.

In another embodiment of this aspect of the invention the polymer composition consists essentially of polycyclic repeating units wherein at least a portion of said repeating units are represented by the formula (V):

(V)

wherein Ar is a divalent group or a moiety selected from phenyl, naphthyl, anthracenyl and triphenylamine.

In another embodiment of this invention the polymer composition consists essentially of polycyclic repeating units wherein at least a portion of said repeating units are represented by the formula (VI):

(VI)

wherein Ar is a divalent group or a moiety which in each occurrence is independently selected from phenyl, naphthyl, anthracenyl and triphenylamine.

In another aspect of this invention representative monomer repeating units encompassed by polymer composition of formula (IV) of this invention without any limitation are listed below:

4-(bicyclo[2.2.1]hept-5-an-2-yl)phenyl formate

4-(bicyclo[2.2.1]hept-5-an-2-yl)-3-methylphenyl formate

4-(bicyclo[2.2.1]hept-5-an-2-yl)-3,5-dimethylphenyl formate

4-(bicyclo[2.2.1]hept-5-an-2-yl)-3-
methoxyphenyl formate

4-(bicyclo[2.2.1]hept-5-an-2-yl)-3,5-
dimethoxyphenyl formate

4-(bicyclo[2.2.1]hept-5-an-2-yl)-3-
fluoroyphenyl formate

4-(bicyclo[2.2.1]hept-5-an-2-yl)-3,5-
difluorophenyl formate

6-(bicyclo[2.2.1]hept-5-an-2-yl)
naphthalen-2-yl formate

7-(bicyclo[2.2.1]hept-5-an-2-yl)anthracen-2-yl formate

7-(bicyclo[2.2.1]hept-5-an-2-yl)
phenanthren-2-yl formate

3-((4-(bicyclo[2.2.1]hept-5-an-2yl)phenyl)(phenyl)
amino)phenyl formate 6-(bicyclo[2.2.1]hept-5-an-2-yl)pyridin-3-
yl formate 3-(bicyclo[2.2.1]hept-5-an-2-yl)quinolin-7-yl formate; and 5-(bicyclo[2.2.1]hept-5-en-2-yl)
furan-3-yl formate In a further embodiment, the repeating units encompassed by polymer composition of formula (IV) according to this invention is 4-(bicyclo[2.2.1]hept-5-an-2-yl)phenyl formate.

Polymer Preparation

In general, the monomeric compounds of formula (I), (II) or (III) as described herein can be polymerized to form the polymers of this invention containing the respective monomeric repeat units as represented by formula (IV), (V) or (VI). Any of the polymerization methods can be employed to form the polymer compositions of this invention. For instance, polymerization of various norbornene-type monomers are disclosed in U.S. Pat. Nos. 5,929,181; 6,455,650; 6,825,307; and 7,101,654. In general, the polymerization can be carried out either in solution or in mass suitably in the presence of a catalyst and a desirable solvent. Any of the known catalyst system which brings about the polymerization of the compounds of formula (I) can be used. The catalyst is generally added to the reaction medium containing the desired monomer(s), i.e., the compounds of formula (I) as a preformed single component catalyst or the catalyst can be formed in situ.

For example, in a solution process, the polymerization reaction may be carried out by adding a solution of the preformed catalyst or individual catalyst components to a solution of the compound of formula (I), i.e., the monomer to be polymerized. In some embodiments, the amount of monomer dissolved in the solvent ranges from about 5 to about 50 weight percent (wt. %), and in other embodiments from about 10 to about 30 wt. %, and in still other embodiments from about 10 to about 20 wt. %. After the preformed catalyst or catalyst components are added to the monomer solution, the reaction medium is agitated (e.g. stirred) to ensure complete mixing of catalyst and monomer components.

The polymerization can further be carried out at suitable temperature, such as at ambient temperature or at superambient temperatures for a period of time adequate for the polymerization. In certain situations, depending upon the type of monomer involved and depending upon the type of catalysts employed subambient reaction temperatures can also be used. More specifically, the polymerization reaction temperatures can range from about 0° C. to about 150° C. In some embodiments the reaction temperature can range from about 10° C. to about 100° C., and in some other embodiments the reaction temperature can range from about 20° C. to about 80° C.

Examples of solvents for the polymerization reaction include but are not limited to hydrocarbon solvents, including alkane and cycloalkane solvents, such as pentane, hexane, heptane, and cyclohexane; halogenated alkane solvents such as dichloromethane, chloroform, carbon tetrachloride, ethylchloride, 1,1-dichloroethane, 1,2-dichloroethane, 1-chloropropane, 2-chloropropane, 1-chlorobutane, 2-chlorobutane, 1-chloro-2-methylpropane, and 1-chloropentane; aromatic solvents such as benzene, xylene, toluene, mesitylene, chlorobenzene, and o-dichlorobenzene, Freon™ 112 halocarbon solvent, ketone solvents such as acetone, methyl ethyl ketone (MEK), ester solvents such as ethyl acetate, water; or mixtures thereof. Other useful solvents that can be included are ethers, such as, diethyl ether, tetrahydrofuran, lactones, ketones and amides. Mixtures of one or more of the foregoing solvents can be utilized as a polymerization solvent. In some embodiments the solvents employed include MEK, ethyl acetate, cyclohexane, toluene, mesitylene, dichloromethane, 1,2-dichloroethane, and water.

In a few of the embodiments, the compounds of formula (I), (II) or (III) of this invention are polymerized under a free radical polymerization conditions. Typically in a free radical polymerization process, the monomers are polymerized in a solvent at an elevated temperature (about 50° C. to about 150° C.) in the presence of a free radical initiator. Suitable initiators include but are not limited to azo compounds and peroxides. Examples of free radical initiators are azobisisobutyronitrile (AIBN), benzoyl peroxide, lauryl peroxide, azobisisocapronitrile, azobisisovaleronitrile, tert-butylhydroperoxide and di-tert-butylperoxide.

In one of the embodiments of this invention the free radical catalyst initiators are particularly useful when polymerizing the compounds of formula (I), (II) or (III) alone or in combination with a monomer selected from acrylic acid, methacrylic acid, maleic acid, itaconic acid, citraconic anhydride, itaconic anhydride, maleic anhydride, and linear or branched ($C_1$ to $C_5$) alkyl esters of acrylic acid, sulfur dioxide, or a mixture of two or more thereof.

Nickel containing catalysts useful for making the polymers utilized in this invention may be represented by the formula:

wherein p is 1 or 2 and E represents a neutral 2 electron donor ligand. When p is 1, E is generally a pi-arene ligand such as toluene, benzene, and mesitylene. When p is 2, E is selected from diethyl ether, tetrahydrofuran (THF), ethyl acetate (EtOAc) and dioxane. The ratio of monomer to catalyst in the reaction medium can range from about 5000:1 to about 50:1 in some embodiments of the invention, and in other embodiments at a ratio of about 2000:1 to about 100:1. The reaction may be run in a suitable solvent at a temperature range from about 0° C. to about 70° C. In some embodiments, the temperature can range from about 10° C. to about 50° C., and in other embodiments from about 20° C. to about 40° C. Exemplary catalysts of the above formula include (toluene)bis(perfluorophenyl) nickel, (mesitylene)bis(perfluorophenyl) nickel, (benzene)bis(perfluorophenyl) nickel, bis(tetrahydrofuran)bis(perfluorophenyl) nickel, bis(ethyl acetate)bis(perfluorophenyl) nickel and bis(dioxane)bis(perfluorophenyl) nickel.

Palladium containing catalysts useful for making the polymers utilized in this invention can be prepared as a preformed single component catalyst or prepared in situ by admixing a palladium containing procatalyst with an activator in the presence of the desired monomer(s) to be polymerized.

The preformed catalyst can be prepared by admixing the catalyst precursors such as a procatalyst and activator in an appropriate solvent, allowing the reaction to proceed under appropriate temperature conditions, and isolating the reaction product, a preformed catalyst product. By procatalyst is meant a palladium containing compound that is converted to an active catalyst by a reaction with a cocatalyst or activator compound. Further description and synthesis of representative procatalysts and activator compounds can be found in U.S. Pat. No. 6,455,650, as noted above.

Palladium procatalysts suitable for the polymerization of the compounds of this invention are represented by the formula:

wherein $R_3$ is selected from isopropyl and cyclohexyl; and L is selected from trifluoroacetate, and trifluoromethanesulfonate (triflate). Representative procatalyst compounds in accordance with such formula are (allyl)palladium(tricyclohexylphosphine)triflate, (allyl)palladium(tri-isopropylphosphine)-triflate, (allyl)palladium(tri-cyclohexylphosphine)trifluoroacetate, and (allyl)palladium(tri-isopropylphosphine) trifluoroacetate.

Representative activator compounds may be selected from lithium tetrakis(pentafluorophenyl) borate (LiFABA) and N,N-dimethylaniliniumtetrakis-(pentafluorophenyl) borate (DANFABA).

In one of the embodiments of this invention, a palladium compound, Pd(OC(O)CH$_3$), a phosphine compound, and the activators, LiFABA or DANFABA, referred to above can be mixed in situ with the desired monomer(s) to be polymerized. Representative phosphine compounds are phosphines such as tricyclohexylphosphine and tri isopropylphosphine.

In another embodiment of the invention, the molar ratio of palladium procatalyst (based on the palladium metal) to activator is 1 to 2. In another embodiment, the ratio is 1 to 4, and in another embodiment the ratio is 1 to 1. It should be noted that the order of addition of the various catalyst components mentioned above to the reaction medium is not important.

The palladium catalysts in accordance with the present invention may exhibit a high activity at monomer to procatalyst molar ratios (i.e., monomer to palladium metal) of over 100,000:1. In some embodiments of the invention, monomer to procatalyst ratios can range from about 100,500:1 to about 1,000,000:1. In other embodiments, from about 110,000:1 to about 500,000:1, and in still other embodiments from about 120,000:1 to about 250,000:1. While these catalysts have been found to be active at monomer to catalyst metal molar ratios of over 100,000:1, it should be recognized that it is within the scope of this invention to utilize monomer to catalyst metal molar ratios of less than 100,000:1. Depending on the activity of a particular catalyst, the reactivity of a certain monomer, the desired molecular weight, or desired polymer backbone tacticity, higher concentrations of catalyst to monomer loading are well within the scope of the present invention (i.e., monomer to catalyst loadings of 50:1 to 99,999:1).

Various other palladium catalysts have also been reported in the literature which can be used in the vinyl addition polymerization method of this invention to form polymers of formula (IV), (V) or (VI) from the corresponding monomers of formula (I), (II) or (III). See for example, U.S. Patent Publication No. 20050187398 A1, which discloses certain of the palladium catalysts that can be used in the solution or mass polymerization of various polycyclic olefinic monomers. The palladium catalysts as disclosed therein are of the formula (B) or (C) as represented below:

[(E(R)$_3$)$_a$Pd(Q)(LB)$_b$]$_p$[WCA]$_r$  (B)

[(E(R)$_3$)(E(R)$_2$R*)Pd(LB)]$_p$[WCA]$_r$  (C)

In Formula (B), E(R)$_3$ represents a Group 15 neutral electron donor ligand where E is selected from a Group 15 element of the Periodic Table of the Elements, and R independently represents hydrogen (or one of its isotopes), or an anionic hydrocarbyl containing moiety; Q is an anionic ligand selected from a carboxylate, thiocarboxylate, and dithiocarboxylate group; LB is a Lewis base; WCA represents a weakly coordinating anion; a represents an integer of 1, 2, or, 3; b represents an integer of 0, 1, or 2, where the sum of a+b is 1, 2, or 3; and p and r are integers that represent the number of times the palladium cation and the weakly coordinating anion are taken to balance the electronic charge on the structure of Formula (B).

In Formula (C), E(R$_3$) is as defined for Formula (B), and E(R)$_2$R* also represents a Group 15 neutral electron donor ligand where E, R, r and p are defined as above and where R* is an anionic hydrocarbyl containing moiety, bonded to the Pd and having a β hydrogen with respect to the Pd center.

Exemplary palladium catalysts within the scope of formula (B) or (C) include but not limited to the following:

[Pd(OAc)(P(Cy)$_3$)$_2$(MeCN)][B(C$_6$F$_5$)$_4$],

[Pd(OAc)(P(Cy)$_2$(CMe$_3$))$_2$(MeCN)][B(C$_6$F$_5$)$_4$],

[Pd(OAc)(P(i-Pr)(CMe$_3$)$_2$)$_2$(MeCN)][B(C$_6$F$_5$)$_4$],

[Pd(OAc)$_2$(P(i-Pr)$_2$(CMe$_3$))$_2$(MeCN)][B(C$_6$F$_5$)$_4$],

[Pd(OAc)(P(i-Pr)$_3$)$_2$(MeCN)][B(C$_6$F$_5$)$_4$],

[Pd(O$_2$C-t-Bu)(P(Cy)$_3$)$_2$(MeCN)][B(C$_6$F$_5$)$_4$],

[Pd(O$_2$C-t-Bu)(P(C$_y$)$_2$(CMe$_3$))$_2$(MeCN)][B(C$_6$F$_5$)$_4$],

[Pd(O$_2$C-t-Bu)$_2$(P(i-Pr)$_2$(CMe$_3$))$_2$,

[Pd(O$_2$C-t-Bu)(P(i-Pr)$_3$)$_2$(MeCN)][B(C$_6$F$_5$)$_4$], cis-[Pd(Pd(P(i-Pr)$_3$)(κ$^2$-P,C—P(i-Pr)$_2$(C(CH$_3$)$_2$)(MeCN)][B(C$_6$F$_5$)$_4$], and cis-[Pd(P(i-Pr)$_3$)(κ$^2$-P,C—P(i-Pr)$_2$(C(CH$_3$)$_2$)(NC$_5$H$_5$)][B(C$_6$F$_5$)$_4$.

Wherein OAc is acetate, Cy is cyclohexyl, MeCN is acetonitrile, Me is methyl, i-Pr is isopropyl, t-Bu is tert-butyl, and κ$^2$ is bidentate.

Suitable polymerization solvents for the free radical and vinyl addition polymerization reactions can include any of the solvents described above.

When utilizing the vinyl-addition nickel and palladium catalysts disclosed above, the molecular weight of the polymer can be controlled by employing a chain transfer agent disclosed in U.S. Pat. No. 6,136,499. In one embodiment of the invention, α-olefins, (e.g., ethylene, propylene, 1-hexene, 1-decene, 4-methyl-1-pentene) and cyclohexene are suitable as molecular weight control agents.

In certain other situations precursors or derivatives of compounds of formula (I), (II) or (III) are employed in the polymerization. The resulting polymer is then converted to formates of formula (IV), (V) or (VI) using any of the methods known in the art. For example, it has now been found that the corresponding acetate esters of the compound of formula (I), (II) or (III) are first polymerized to form the corresponding acetate ester containing polymeric compositions of formula (IV), (V) or (VI). The acetate group is then hydrolyzed by subjecting to suitable hydrolysis reaction. The hydrolysis reaction can be carried out using any of the methods known in the art including acid, base or a catalyst or agent involving essentially neutral pH conditions. For example, the acetate groups of the polymeric compositions are hydrolyzed using sodium hydroxide solution in a suitable solvent at a suitable reaction temperature. The acidic hydrolysis conditions utilize generally an alcoholic solvent such as methanol and catalytic amounts of acid such as hydrochloric acid. The resulting polymer composition containing the hydroxyl pendant groups are then reacted with a suitable formylating agent such as a mixture of formic acid and acetic anhydride to form the formate polymer compositions of formula (IV), (V) or (VI).

In one of the embodiments of the invention, the polymer suitable for use in the formation of the inventive optical waveguide structures comprises from about 95 to about 5 mole % (based on the total mole % of the repeating units contained in the polymer backbone) of at least one polycyclic repeating unit defined under Formula (IV), (V) or (VI) and from about 5 to about 95 mole % of at least polycyclic repeating unit containing other than the formate pendent group such as an acetate. In another embodiment, the polymer comprises from about 80 to about 20 mole % of at least one polycyclic repeating unit defined under Formula (IV), (V) or (VI) and from about 20 to about 80 mole % of at least one polycyclic repeating unit containing other than the formate pendent group such as an acetate.

In an embodiment of this invention, the polymers of formula (IV), (V) or(VI) have a weight average molecular weight of from about 2,000 to about 200,000, and in another embodiment from about 5,000 to about 150,000, and in yet another embodiment from about 10,000 to about 120,000. Molecular weights of the polymers obtained may be measured by use of gel permeation chromatograph (GPC) using polystyrene standards. The elution solvent employed is generally tetrahydrofuran. Instrument: HLC-8220 (Tosoh Corp.), using a differential refractometer detector, flow rate of 1.0 ml/min and column temperature, 40° C. The absolute molecular weight of the polystyrene standards may be generated utilizing a Chromatics CMX 100 low angle laser light scattering instrument.

Optical Waveguide Structures

Surprisingly, it has now been found that the polymer composition according to the present invention, namely polymers of formula (IV), (V) or (VI) are photosensitive polymers and are capable of exhibiting a change of refraction index of more than or equal to 0.5% when subjected to either suitable actinic or thermal energy. That is, when a film formed of the polymer composition of formula (IV), (V) or (VI) is subjected to an actinic energy, i.e., irradiated using a suitable light source, the value of change in refractive index before and after irradiating with actinic energy is 0.5% or more. Similarly, when a film formed of the polymer composition of formula (IV), (V) or (VI) is subjected to a suitable thermal energy, i.e., heated to a suitable temperature, the value of change in refractive index before and after applying thermal energy is 0.5% or more. Generally, it has been observed in some embodiments that irradiation with actinic energy is found to be more advantageous over subjecting to the thermal energy.

In some embodiments the irradiation with actinic energy in the form of ultraviolet light (light source having a wavelength of 10 nm to 450 nm) is employed. In certain other embodiments the radiation with actinic energy in the form of light having a wavelength of 150 nm to 365 nm is employed. The radiation dose in the case of using ultraviolet light for the actinic energy is generally from about 1 J/cm$^2$ to about 30 J/cm$^2$. In other embodiments the radiation dose is from about 2 J/cm$^2$ to about 15 J/cm$^2$. A radiation dose of from about 3 J/cm$^2$ to about 12 J/cm$^2$ is employed in some other embodiments. Examples of light sources of the actinic energy that can be used include but not limited to F$_2$ laser light, ArF laser light, KrF laser light, i-line, h-line and g-line of a Hg vapor lamp. In addition, when irradiating with light, the wavelength of light radiated from the light source may be adjusted using a filter.

As noted above, generally the polymer composition of formula (IV), (V) or (VI) according to the present invention causes at least 0.5% or more than 0.5% of change in refractive index. In certain of the embodiments the polymer composition of formula (IV), (V) or (VI) causes more than 0.6% of change in refractive index. In some other embodiments the polymer composition of formula (IV), (V) or (VI) causes more than 0.8% of change in refractive index, and in yet other embodiments the polymer composition of formula (IV), (V) or (VI) causes more than 0.94% of change in refractive index. Refractive index values may be measured using any arbitrary commercially available refractive index/film thickness measuring device, and can be measured using, for example, the Model 2010 Prism Coupler (measuring wavelength: 633 nm) manufactured by Metricon Corp.

Without wishing to be bound to any particular theory, it is believed that radiating, using a suitable light such as ultraviolet light, the film formed by the polymer composition of formula (IV), (V) or (VI) according to the present invention, the formate group on the aryl group, i.e., the phenyl group as exemplified in Scheme III, i.e., polymer of formula (V-1) undergoes a photo Fries rearrangement to form a rearranged polymer of formula (V-1B) or a degradation polymer product of formula (V-1C) via a bi-radical intermediate of formula (V-1A). It is believed that either one of these degradation reaction product and/or rearrangement reaction product causes changes in the refractive index.

The terms "waveguide channel" or "core" refer to a portion of a polymeric film having a square or rectangular cross-sectional profile with the dimensions of the square or rectangular cross-sectional profile ranging from about 1 μm to about 200 μm in some embodiments, from about 5 μm to about 100 μm in other embodiments and from about 10 μm to about 60 μm in still other embodiments. Such waveguide channel or core regions are further characterized as having a refractive index that is higher than the refractive index of laterally adjacent regions which are referred to as cladding regions. Optical waveguides according to the embodiments of the present invention can be used, for example, in data communication using a range of wavelengths, generally, but not limited to, 600 nm to 1550 nm. Usually, the wavelengths of operation depend on materials and their optical characteristics.

(1) Resin Composition

The resin composition used in forming the waveguides of this invention generally contains at least one polymer of formula (IV), (V) or (VI). In some embodiments the amount of at least one polymer of formula (IV), (V) or (VI) is from about 30% by weight (wt. %) to about 100% by weight. In some other embodiments the amount of at least one polymer of formula (IV), (V) or (VI) is from about 50% by weight to 100% by weight. Finally, in some embodiments the amount of at least one polymer of formula (IV), (V) or (VI) is from about 90% by weight to 100% by weight.

The resin composition according to the present invention may also contain an initiator, catalyst, curing catalyst, antioxidant or photo acid generator and the like within a range that does not deviate from the object and gist of the present invention.

(2) Resin Film

The resin film according to the present invention is characterized by being composed of the resin composition according to the present invention. The content of the resin composition in the resin film according to the present invention is generally from about 30% by weight to about 100% by weight. In some other embodiments the content of the resin composition in the resin film according to the present invention is generally from about 50% by weight to about 100% by weight. In a few other embodiments the content of the resin composition in the resin film according to the present invention is generally from about 90% by weight to about 100% by weight.

A method for producing the resin film according to the present invention first includes a step for preparing a resin varnish by dissolving the resin composition according to the present invention in a solvent and a step for forming a coated film of the resin varnish on a support substrate.

Examples of solvent used to prepare the resin varnish by dissolving the resin composition include, but are not limited to, ether type solvent such as diethyl ether, diisopropyl ether, 1,2-dimethoxyethane (DME), 1,4-dioxane, tetrahydrofuran (THF), tetrahydropyran (THP), anisole, diethylene glycol dimethyl ether (diglyme) and diethylene glycol ethyl ether (carbitol), cellosolve type solvent such as methylcellosolve, ethylcellosolve and phenylcellosolve, aliphatic hydrocarbon type solvent such as hexane, pentane, heptane, cyclohexane and cyclohexanone, aromatic hydrocarbon type solvent such as toluene, xylene, benzene and mesitylene, heteroaromatic compound type solvent such as pyridine, pyrazine, furan, pyrrole, thiophene and methylpyrrolidone, amide type solvent such as N,N-dimethyl formamide (DMF) and N,N-dimethyl acetamide (DMAc), halogen compound type solvent such as dichloromethane, chloroform and 1,2-dichloroethane, ester type solvent such as ethyl acetate, methyl acetate and ethyl formate, and sulfur compound type solvent such as dimethyl sulfoxide (DMSO) and sulfolane, wherein these solvents may be used singly, or as a mixture in any combinations thereof.

Examples of the support substrate include, but are not limited to, a silicon wafer, silicon dioxide substrate, glass substrate, quartz substrate and polyethylene terephthalate (PET) film.

Examples of coating methods used to form the coated film include, but are not limited to, doctor blade coating, spin coating, dipping, table coating, spray coating, applicator coating, curtain coating and die coating.

Although there are no particular limitations on the thickness of the thin film, the thickness prior to drying is generally from about 5 µm to 200 µm, or from about 15 µm to 125 µm, or from about 25 µm to 100 µm.

(3) Optical Waveguide

The optical waveguide according to the present invention is characterized by being composed of a product of the resin composition of formula (IV), (V) or (VI) according to the present invention or being composed of a product of the resin film according to the present invention.

A method for obtaining a product of the resin composition according to the present invention or a product of the resin film according to the present invention includes a step for dissolving the resin composition and the like in a solvent, and as needed, a drying step and/or heating step in order to remove the solvent.

The optical waveguide according to the present invention can contain a core layer and a clad layer. The core layer of the optical waveguide according to the present invention is composed of a core portion irradiated with actinic energy or applied thermal energy and a non-irradiated portion. The method of irradiation may be carried out by direct writing or through a mask so as to form a pattern. In some embodiments the irradiation is carried out by direct writing.

Figure 1:
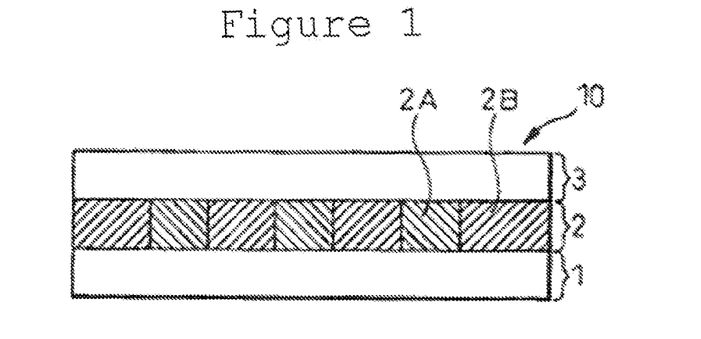
FIG. 1 is a simplified cross-sectional view of an optical waveguide embodiment in accordance with the present invention.
Figure 2:
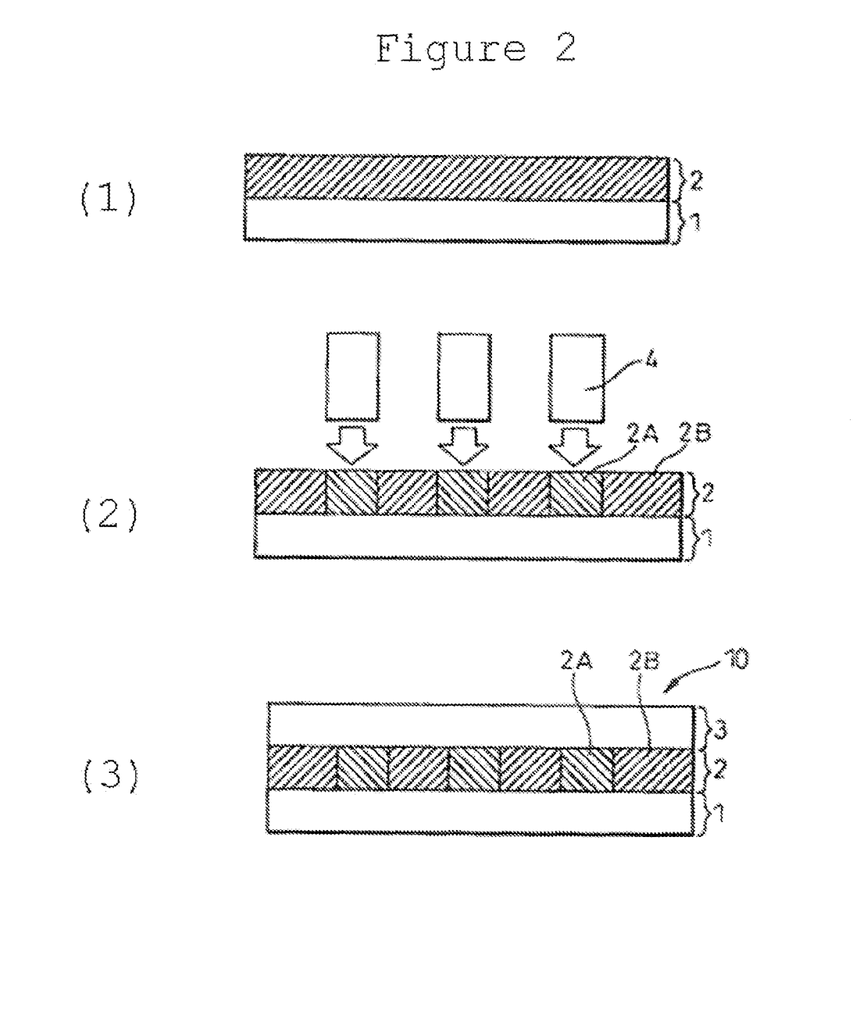

A schematic cross-sectional view of one aspect of the optical waveguide according to the present invention is shown in FIG. 1. An optical waveguide 10 shown in FIG. 1 is composed of a first clad layer 1, a core layer 2 and a second clad layer 3. The core layer 2 is composed of irradiated core portions 2A and non-irradiated portions 2B.

A product of the resin composition according to the present invention or the resin film according to the present invention is preferably contained in the core layer of the optical waveguide according to the present invention. In addition to containing a product of the resin composition according to the present invention or the resin film according to the present invention in the core layer of the optical waveguide according to the present invention, a resin material such as an acrylic resin, epoxy resin, polyimide resin or benzocyclobutene resin may also be contained.

There are no particular limitations on the materials contained in the clad layers of the optical waveguide according to the present invention provided they have a lower refractive index than the materials contained in the core layer. Examples of such materials include resin materials such as an acrylic resin, epoxy resin or polyimide resin.

The following provides an explanation of a method for producing the optical waveguide according to the present invention. Although an explanation is provided using FIG. 2, which is a drawing for explaining one aspect of a method for producing the optical waveguide according to the present invention, the production method is not limited to that shown in FIG. 2 provided it is within a range that does not deviate from the object and gist of the present invention.

First, a varnish containing a material that composes the first clad layer 1 is coated onto a substrate (not shown) to form the first clad layer 1, followed by coating a varnish containing the resin composition or resin film according to the present invention that composes the core layer 2 onto the first clad layer 1 to form the core layer 2 (FIG. 2(1)). Next, a substrate (not shown) is separated from the first clad layer 1 and ultraviolet light is radiated onto the core layer 2 by direct drawing to form the core portions 2A and the non-irradiated portions 2B in the core layer 2 (FIG. 2(2)). A varnish containing the material that composes the second clad layer 3 is then coated onto the core layer 2 to form the second clad layer 3 and fabricate the optical waveguide 10 (FIG. 2(3)). As shown in FIG. 2, since resin composition and resin film according to the present invention enable the core portions 2A and the non-irradiated portions 2B to be formed by radiating ultraviolet light onto the core layer 2 by direct drawing without going through a mask, the optical waveguide 10 can be produced easily and efficiently. Furthermore, although not shown in FIG. 2, the core portions 2A and the non-irradiated portions 2B may also be formed by radiating ultraviolet light onto the core layer 2 through a mask.

The thickness of the first clad layer 1 that composes the fabricated optical waveguide 10 (FIG. 2(3)) is generally from about 20 μm to about 120 μm. In some embodiments the thickness of the core layer 2 is from about 25 μm to about 100 μm, and the thickness of the second clad layer 3 is from about 20 μm to about 120 μm. The thickness of the finished optical waveguide that combines the three layers is generally from about 65 μm to about 300 μm.

Surprisingly, it has now been found that an optical waveguide having superior optical transmission performance can be obtained by employing a resin composition containing at least one of polymer composition of formula (IV), (V) or (VI), which upon subjecting to a suitable actinic radiation or thermal energy results in a change in refractive index of at least about 0.5% or more.

According to the present invention, a resin composition, and a resin film and an optical waveguide using the resin composition, are provided that demonstrate superior optical transmission performance by allowing the refractive index thereof to be changed by actinic energy or thermal energy.

(4) Optical Wiring, Mixed Optoelectronic Boards and Electronic Devices

Optical wiring can be provided with the optical waveguide of the present invention. As a result thereof, the degree of freedom of processing can be improved since there is no need to go through development or reactive ion etching (RIE) and the like in the waveguide production process.

In addition, a mixed optoelectronic board can have electrical wiring and optical wiring provided with the optical waveguide of the present invention. As a result thereof, electromagnetic interference (EMI), which presented a problem for conventional electrical wiring, can be improved making it possible to greatly improve hitherto unachievable signal transmission speed.

In addition, electronic devices can be provided with the optical waveguide of the present invention. As a result thereof, space can be conserved. Specific examples of such electronic devices include but not limited to computers, servers, cell phones, video game machines, memory testers and visual inspection robots.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLE 1

5-(4-Hydroxyphenyl)bicyclo[2.2.1]
hept-2-ene(NBPhOH)Polymer

Into an appropriate size and suitably equipped reaction vessel were placed Ni catalyst (bis(toluene)bis(perfluorophenyl) nickel) (0.08 g). The vessel was purged with dry nitrogen to reduce the moisture content and oxygen concentration to less than 1 ppm. Anhydrous toluene (1.53 g) was then added to dissolve the Ni catalyst. 5-(4-Acetoxyphenyl)bicyclo[2.2.1]hept-2-ene monomer (5.7 g), toluene (10.4 g) and methyl ethyl ketone (MEK) (1.64 g) were weighed into another suitable size reaction vessel followed by purging the vessel with nitrogen for 30 minutes and the vessel was sealed with a septum. Subsequently, the Ni catalyst solution prepared in the manner described above was injected into the vessel using a syringe followed by stirring for 18 hours at 25° C. to obtain a 5-(4-acetoxyphenyl)bicyclo[2.2.1]hept-2-ene polymer solution. The 5-(4-acetoxyphenyl)bicyclo-[2.2.1] hept-2-ene polymer solution (19 g) thus obtained was mixed with tetrahydrofuran (THF) (9.5 g), methanol (MeOH) (9.5 g) and an aqueous sodium hydroxide (NaOH) solution (prepared by dissolving 3 g of NaOH in 27 g of water) in another suitably equipped reaction vessel and stirred for 3 hours in an oil bath at 90° C. to obtain an NBPhOH polymer solution. The NBPhOH polymer solution (68 g) thus obtained was then mixed with acetic acid (6.76 g), formic acid (5.18 g) and aqueous hydrogen peroxide (11.33 g) taken in a suitable reaction vessel and stirred for 3 hours in an oil bath at 90° C.

Subsequently, the reaction liquid was transferred to a separatory funnel and the lower aqueous layer was removed, the upper layer was transferred to a suitable reaction vessel, THF (9.5 g) and distilled water (19 g) were added and stirred for 15 minutes in an oil bath at 60° C. This water rinsing process was repeated twice after changing the amount of THF (3.8 g). The reaction liquid following rinsing was transferred to a separatory funnel and the lower aqueous layer was removed, followed by adding toluene (200 ml) to separate into layers. The organic layer was washed three times with water, dried and the solvent was removed under reduced pressure to recover NBPhOH polymer (2 g; MW: 12,600).

EXAMPLE 2

5-(4-formyloxyphenyl)bicyclo[2.2.1]
hept-2-ene(NBPhOCOH)Polymer

Into an appropriately sized and equipped reaction vessel were placed formic acid (3.81 g) and acetic anhydride (8.54 g) and stirred for 30 minutes at a temperature of 45° C. or lower. To this mixture was added a solution of NBPhOH polymer (2 g; Mw: 12,600) obtained in Example 1 in THF (30 ml) containing 0.1 g of pyridine and continued to stir at room temperature for 3 days under nitrogen atmosphere. After stirring, the solution was re-precipitated with water followed by air-drying at room temperature to recover NBPhOCOH polymer.

EXAMPLE 3

5-(4-formyloxyphenyl)bicyclo
[2.2.1]hept-2-ene

Into an appropriately sized and equipped reaction vessel are placed equimolar amounts of dicyclopentadiene and 4-formyloxystyrene (prepared in accordance with the procedures as set forth in Yin et al., Polymer Preprints 2010, 51(1), 506), and appropriate catalytic amounts of phenothiazine. The reaction mixture is stirred while the reaction vessel is evacuated to remove air and pressurized to 5 psig with nitrogen. The reaction vessel is then heated to 160° C. and maintained at that temperature for 6 hours. The reactor is then cooled to ambient temperature and the reaction mixture is distilled to obtain the title compound.

EXAMPLE 4

5-(4-formyloxyphenyl)bicyclo[2.2.1]
hept-2-ene(NBPhOCOH)Polymer

The polymerization step of Example 1 is substantially repeated employing desired amounts of 5-(4-formyloxyphenyl)bicyclo[2.2.1]hept-2-ene monomer to obtain the title polymer.

EXAMPLE 5

Production of Varnish (Resin Composition)

NBPhOCOH polymer (1 g) obtained in the manner described in Example 2 was dissolved in cyclohexanone at room temperature to a solid content of 20% by weight to 10% by weight to produce a varnish.

EXAMPLE 6

Production of Optical Waveguide

The varnish obtained in the manner described in Example 5 was coated onto a quartz glass substrate measuring 2 inches by 2 inches using an applicator to form a coated film having a thickness of 3 μm over the entire surface thereof. Actinic energy was radiated onto the coated film obtained in the manner described above under the following conditions using the light source device indicated below to change the refractive index of the coated film and produce an optical waveguide having a core layer having a line width of 40 μm:
Ultraviolet Irradiation (Direct Drawing Exposure)
Energy of about 10 J/cm$^2$ was radiated using the device indicated below.
Device name: High Power Xenon Light Source Series MAX-302,
Asahi Spectra Co., Ltd.
Light source: Xenon light source
Wavelength: 254 nm
Illuminance: 1.49 mW/cm$^2$

EXAMPLE 7

Measurement of Change in Refractive Index

Whether or not a reaction occurred was confirmed with the attenuated total reflection (ATR) method using a Fourier transform infrared spectrometer (FTIR-8900, Shimadzu Corp., measuring range: 750 cm$^{-1}$ to 4000 cm$^{-1}$). Furthermore, the ATR method is a method for obtaining the absorp- tion spectrum of a sample surface by measuring the total amount of light reflected by the sample surface. More specifically, progression of the overall reaction was confirmed based on an increase in phenol-derived hydroxyl groups at a wave number of 3200 cm$^{-1}$ to 3700 cm$^{-1}$ and a decrease in formyl group-derived carboxyl groups in the vicinity of 1750 cm$^{-1}$, while progression of the rearrangement reaction was confirmed based on an increase in aldehyde-derived carboxyl groups in the vicinity of 1600 cm$^{-1}$. The change in refractive index was confirmed using a refractive index/film thickness measuring device (Model 2010 Prism Coupler, Metricon Corp., measuring wavelength: 633 nm). In contrast to the refractive index prior to irradiation with actinic energy being 1.5870, that after irradiation was confirmed to have increased by 0.94% to 1.6019.

| BRIEF DESCRIPTION OF THE REFERENCE SYMBOLS | |
|---|---|
| 1: | First clad layer |
| 2: | Core layer |
| 2A: | Core portions |
| 2B: | Non-irradiated portions |
| 3: | Second clad layer |
| 4: | Light source |
| 10: | Optical waveguide |

While the invention has been explained in relation to various embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A compound of the formula (I):

(I)

wherein;

X is selected from —CH$_2$—, —CH$_2$—CH$_2$—, —O—, —S—, and —NH—;

m is an integer from 0 to 5; and each occurrence of R$_1$ and R$_2$ independently represents hydrogen or a monovalent group of the formula (A):

(A)

wherein:

X$_1$ is selected from —O—, —S—, and —NH—;

Ar is a divalent group which is substituted or unsubstituted aryl or heteroaryl; and with the proviso that both R$_1$ and R$_2$ are not simultaneously hydrogen.

2. The compound according to claim 1, wherein:
X is —CH$_2$—;
m is 0;
X$_1$ is —O—; and
Ar is aryl.

3. The compound according to claim 1, wherein:
X is —CH$_2$—;
m is 0;
X$_1$ is —O—; and
Ar is heteroaryl.

4. The compound according to claim 1, wherein Ar is aryl selected from substituted or unsubstituted phenyl, substituted or unsubstituted naphthyl, substituted or unsubstituted anthracenyl, substituted or unsubstituted phenanthrenyl, substituted or unsubstituted triphenylamine, and wherein said substituents are selected from C$_1$-C$_4$alkyl, C$_1$-C$_4$alkoxy, halogen, and C$_1$-C$_4$perfluoroalkyl.

5. The compound according to claim 1, wherein Ar is selected from 4-phenyl, 3-methyl-4-phenyl, 3,5-dimethyl-4-phenyl, 3-methoxy-4-phenyl, 3,5-dimethoxy-4-phenyl, 3-fluoro-4-phenyl, 3,5-difluoro-4-phenyl, and 6-naphthyl.

6. The compound according to claim 1, wherein Ar is selected from substituted or unsubstituted thienyl, substituted or unsubstituted furanyl, substituted or unsubstituted pyrrolyl, substituted or unsubstituted pyridinyl, and substituted or unsubstituted quinolinyl.

7. The compound according to claim 1, which is represented by the formula (II):

(II)

wherein Ar is a divalent group selected from phenyl, naphthyl, anthracenyl and triphenylamine.

8. The compound according to claim 1, which is represented by the formula (III):

(III)

wherein Ar is a divalent group which in each occurrence is independently selected from phenyl, naphthyl, anthracenyl and triphenylamine.

9. The compound according to claim 1, which is selected from:
4-(bicyclo[2.2.1]hept-5-en-2-yl)phenyl formate;
4-(bicyclo[2.2.1]hept-5-en-2-yl)-3-methylphenyl formate;
4-(bicyclo[2.2.1]hept-5-en-2-yl)-3,5-dimethylphenyl formate;
4-(bicyclo[2.2.1]hept-5-en-2-yl)-3-methoxyphenyl formate;
4-(bicyclo[2.2.1]hept-5-en-2-yl)-3,5-dimethoxyphenyl formate 4-(bicyclo[2.2.1]hept-5-en-2-yl)-3-fluorophenyl formate;
4-(bicyclo[2.2.1]hept-5-en-2-yl)-3,5-difluorophenyl formate;
6-(bicyclo[2.2.1]hept-5-en-2-yl)naphthalen-2-yl formate;
7-(bicyclo[2.2.1]hept-5-en-2-yl)anthracen-2-yl formate;
7-(bicyclo[2.2.1]hept-5-en-2-yl)phenanthren-2-yl formate;
3-((4-(bicyclo[2.2.1]hept-5-en-2-yl)phenyl)(phenyl)amino)phenyl formate;
6-(bicyclo[2.2.1]hept-5-en-2-yl)pyridin-3-yl formate;
3-(bicyclo[2.2.1]hept-5-en-2-yl)quinolin-7-yl formate; and
5-(bicyclo[2.2.1]hept-5-en-2-yl)furan-3-yl formate.

10. The compound according to claim 1, which is 4-(bicyclo[2.2.1]hept-5-en-2-yl)phenyl formate.

11. A polymer composition comprising polycyclic repeating units
wherein at least a portion of said repeating units are represented by the formula (IV):

(IV)

wherein:
X is selected from —CH$_2$—, —CH$_2$—CH$_2$—, —O—, —S—, and —NH—;
m is an integer from 0 to 5; and
each occurrence of R$_1$ and R$_2$ independently represents hydrogen or a monovalent group of the formula (A):

(A)

wherein:
X$_1$ is selected from —O—, —S—, and —NH—;
Ar is a divalent group which is substituted or unsubstituted aryl or heteroaryl; and
with the proviso that both R$_1$ and R$_2$ are not simultaneously hydrogen.

12. The polymer composition according to claim 11, wherein:
X is —CH$_2$—;
m is 0;
X$_1$ is —O—; and
Ar is aryl.

13. The polymer composition according to claim 11, wherein:
X is —CH$_2$—;
m is 0;
X$_1$ is —O—; and
Ar is heteroaryl.

14. The polymer composition according to claim 11, wherein Ar is aryl selected from substituted or unsubstituted phenyl, substituted or unsubstituted naphthyl, substituted or unsubstituted anthracenyl, substituted or unsubstituted phenanthrenyl, substituted or unsubstituted triphenylamine, and wherein said substituents are selected from C$_1$-C$_4$alkyl, C$_1$-C$_4$alkoxy, halogen, and C$_1$-C$_4$perfluoroalkyl.

15. The polymer composition according to claim 11, wherein Ar is selected from 4-phenyl, 3-methyl-4-phenyl, 3,5-dimethyl-4-phenyl, 3-methoxy-4-phenyl, 3,5-dimethoxy-4-phenyl, 3-fluoro-4-phenyl, 3,5-difluoro-4-phenyl, and 6-naphthyl.

16. The polymer composition according to claim 11, wherein Ar is selected from substituted or unsubstituted thienyl, substituted or unsubstituted furanyl, substituted or unsubstituted pyrrolyl, substituted or unsubstituted pyridinyl, and substituted or unsubstituted quinolinyl.

17. The polymer composition according to claim 11, wherein said repeating units are represented by the formula (V):

(V)

wherein Ar is selected from phenyl, naphthyl, anthracenyl and triphenylamine.

18. The polymer composition according to claim 11, wherein said repeating units are represented by the formula (VI):

(VI)

wherein Ar in each occurrence is independently selected from phenyl, naphthyl, anthracenyl and triphenylamine.

19. The polymer composition according to claim 11, wherein said repeating units are selected from:
4-(bicyclo[2.2.1]hept-5-an-2-yl)phenyl formate;
4-(bicyclo[2.2.1]hept-5-an-2-yl)-3-methylphenyl formate;
4-(bicyclo[2.2.1]hept-5-an-2-yl)-3,5-dimethylphenyl formate;
4-(bicyclo[2.2.1]hept-5-an-2-yl)-3-methoxyphenyl formate;
4-(bicyclo[2.2.1]hept-5-an-2-yl)-3,5-dimethoxyphenyl formate
4-(bicyclo[2.2.1]hept-5-an-2-yl)-3-fluorophenyl formate;
4-(bicyclo[2.2.1]hept-5-an-2-yl)-3,5-difluorophenyl formate;
6-(bicyclo[2.2.1]hept-5-an-2-yl)naphthalen-2-yl formate;
7-(bicyclo[2.2.1]hept-5-an-2-yl)anthracen-2-yl formate;
7-(bicyclo[2.2.1]hept-5-an-2-yl)phenanthren-2-yl formate;
3-((4-(bicyclo[2.2.1]hept-5-an-2-yl)phenyl)(phenyl)amino)phenyl formate;
6-(bicyclo[2.2.1]hept-5-an-2-yl)pyridin-3-yl formate;
3-(bicyclo[2.2.1]hept-5-an-2-yl)quinolin-7-yl formate; and
5-(bicyclo[2.2.1]hept-5-an-2-yl)furan-3-yl formate.

20. The polymer composition according to claim 11, wherein said repeating units are 4-(bicyclo[2.2.1]hept-5-an-2-yl)phenyl formate.

21. A photosensitive film capable of exhibiting a change in refractive index of at least about 0.5% upon irradiation with a suitable actinic energy or suitable thermal energy comprising a polymer composition of claim 11.

22. The photosensitive film according to claim 21, wherein the actinic energy having wavelengths of 150 nm to 365 nm.

23. An optical waveguide comprising a polymer composition of claim 11.

24. An optical waveguide comprising a polymer composition of claim 20.

25. An optical waveguide comprising a photosensitive film of claim 21.

* * * * *